United States Patent

[11] 3,615,191

| [72] | Inventors | Ricardo O. Bach;<br>Arthur S. Gillespie, Jr., both of, Gastonia, N.C. |
|---|---|---|
| [21] | Appl. No. | 853,516 |
| [22] | Filed | Aug. 27, 1969 |
| [45] | Patented | Oct. 26, 1971 |
| [73] | Assignee | Lithium Corporation of America<br>New York, N.Y. |

[54] METHOD OF PREPARING LITHIUM SULFIDE
10 Claims, No Drawings

[52] U.S. Cl. .................................................. 23/134
[51] Int. Cl. ............................................ C01b 17/22
[50] Field of Search ........................................ 23/134

[56] References Cited
FOREIGN PATENTS
630,042  10/1949  Great Britain ................ 23/134

OTHER REFERENCES

" Encyclopedia of Chemical Reactions," , by C. A. Jacobson, Vol. IV, page 293, 1951 Ed. Reinhold Publishing Corporation, New York, New York.

" A Comprehensive Treatise on Inorganic and Theoretical Chemistry," Vol. 2, 1922 Ed., pages 624, 625, 642 and 643. Longmans, Green and Co., New York, New York.

*Primary Examiner*—Edward Stern
*Attorney*—Wallenstein, Spangenberg, Hattis & Strampel ABSTRACT: A method of preparing lithium sulfide which comprises forming a reaction mixture of lithium metal and an anhydrous, organic solvent, especially an ether such as tetrahydrofuran capable of dissolving small amounts of lithium metal, heating the reaction mixture to reflux temperature, and introducing hydrogen sulfide into the mixture to form lithium sulfide.

METHOD OF PREPARING LITHIUM SULFIDE

This invention is directed to a new and improved method of preparing lithium sulfide.

Various methods of preparing lithium sulfide are known. Thus, for example, it is known that lithium sulfide can be prepared by first interacting lithium amylate with hydrogen sulfide to produce lithium hydrogen sulfide, and then thermally decomposing the lithium hydrogen sulfide, at temperatures ranging from 120° to 150° C., to obtain lithium sulfide. It is also known that lithium sulfide can be prepared by reacting lithium metal with elemental sulfur in a liquid ammonia medium. Still another known method of preparing the compound involves first preparing the alcoholate of lithium hydrosulfide, and then heating and drying under vacuum at 360° C. to obtain lithium sulfide. These prior art methods, generally speaking, have one or more significant disadvantages, notably from the standpoint of the number of steps required to obtain the sulfide, the number and types of chemical agents used, the low yield and, in certain cases, low purity of the end product.

In accordance with the present invention there is provided a method of preparing lithium sulfide which overcomes various of the aforementioned disadvantages of prior art methods. The method of this invention essentially is carried out in a single step at moderate temperatures, and employs inexpensive, easy-to-handle materials. The lithium sulfide is obtained in a quite pure form, and can be readily processed by known procedures into a dry powder for packaging.

The method of this invention, in brief, involves the steps of forming a reaction mixture consisting essentially of lithium metal and an essentially anhydrous, organic solvent, or, more desirably, a mixture of such solvents, at least one of which is capable of dissolving small amounts of the lithium metal, heating the reaction mixture to reflux temperature, and introducing hydrogen sulfide gas into the mixture to form lithium sulfide. The reaction between the lithium metal and the hydrogen sulfide advantageously is carried out in an atmosphere of an inert gas. The lithium sulfide is obtained in the form of a solid, and can be separated from the reaction mixture by filtration, or by decantation. The lithium sulfide can then be dried in an inert gas atmosphere, and, desirably, packaged in the form of a powder for use.

The lithium metal employed in the practice of the method is pure, or essentially pure, and the particles thereof may range from about 10 microns to 1/2-inch rods. Since large-size lithium metal particles require that the reaction mixture be vigorously agitated to effect formation of lithium sulfide, it is desirable to utilize the lithium metal in pulverulent, or finely divided form. To this end, lithium metal particle sizes of the order of about 10 to about 500 microns are most advantageously used. In forming the lithium metal-organic solvent reaction mixture, the lithium metal may be added in a dry state, or it may be employed in the form in which it is obtained from a lithium metal-mineral oil dispersion after the dispersion has be washed with a solvent such as hexane to remove the mineral oil.

The solvents having utility in the practice of the present invention are characterized in that, while they are inert, or substantially inert, with respect to hydrogen sulfide gas, and to the lithium sulfide obtained from the reaction of the lithium metal with the gas, they advantageously manifest a capability for dissolving small amounts of lithium metal which serves, apparently, to promote the reaction between the lithium metal and the hydrogen sulfide gas. The solvents further are characterized in that they are anhydrous, and have a boiling point such that, when they are used alone, or are admixed with one, or more, compatible solvents of the type contemplated herein, the reaction mixture will reflux at a temperature which favors formation of the lithium sulfide. The foregoing desiderata are met by ethers, particularly cyclic ethers, exemplified by tetrahydrofuran and tetrahydropyran. The generally optimum objectives of the invention are met when such ethers are used in conjunction with other organic solvents including normally liquid aliphatic hydrocarbons specific examples of which are n-pentane, n-hexane, n-heptane, iso-octane, and cyclohexane, or mixtures of paraffin hydrocarbons such as petroleum ether; aromatic hydrocarbons, specific examples of which are benzene, toluene and xylenes; and substantially inert ethers exemplified by dimethyl ether, isopropyl ether, n-butylether, ethylene glycol dimethyl ether, and diethylene glycol dimethyl ether; petroleum solvents such as mineral oil; and the like. Excellent results are attained with a mixture of tetrahydrofuran and n-hexane, wherein the ether constitutes from about 20 to about 30 volume percent of the total organic solvent content of the reaction mixture.

The viscosity of the reaction mixtures will vary in accordance with the nature of the organic solvents utilized in carrying out the reaction between the lithium metal and the hydrogen sulfide gas. In most instances, the viscosity of the reaction mixtures will range from about 0.3 to about 18 centipoises at temperatures of the order of 40° to 50° C.

The temperature at which the reaction between the lithium metal and the hydrogen sulfide gas is carried out is somewhat variable. Generally speaking, however, the reaction will be carried out at temperatures in the range of from about 50° to about 100° C., more advantageously, in the range of from about 60° to about 75° C.

Hydrogen sulfide gas flow rates utilized in the practice of the invention are not critical. It is preferred, however, to employ flow rates in the range of from about 10 to about 50, especially desirably from about 20 to about 30, liters per hour. A closed reaction vessel advantageously is employed in carrying out the reaction, and the vessel is purged of air with an inert gas such as argon or helium. Following separation of the lithium sulfide from the reaction mixture, the lithium sulfide may be dried in a suitable heating device such as a vacuum oven which has been purged of air by flushing with an insert gas. When dry, the pure lithium sulfide is in the form of a powder which conveniently can be packaged in airtight containers.

The following example is illustrative of the manner of carrying out the method of the present invention.

To a 5-liter reaction flask assembly which includes a flask, heating mantle, sparger, stirring paddle, stirring bland, motor, thermometer, and dry ice condenser, are added 2000 ml. of dry hexane and 500 ml. of dry tetrahydrofuran. 227 g. of dry lithium powder are then added. The reaction mixture is heated to reflux temperature (approximately 66° C.), and hydrogen sulfide gas, along with a trace of argon, are bubbled into the mixture. An inert gas atmosphere, such as argon gas, is maintained in the free space in a reaction flask above the reaction mixture. The reaction between the lithium metal and the hydrogen sulfide is carried out for approximately 24 hours. The bulk of the hexane-tetrahydrofuran mixture is removed by filtration, or by decantation after allowing the mixture to stand quiescently. The remaining lithium sulfide paste is transferred to a vacuum oven. The oven is flushed with nitrogen to purge traces of air and the product is vacuum-dried for 4 hours at a temperature of approximately 170° C. The dried product is snowy white in color, and is in the form of dry lumps. The lumps of dried lithium sulfide are reduced to a powder, and the powder is packaged in nitrogen-purged bottles which are then sealed against air intrusion.

What is claimed is:

1. A method of preparing lithium sulfide comprising forming a reaction mixture consisting essentially of lithium metal in particulate form and an anhydrous, organic solvent comprising an ether capable of dissolving small amounts of the lithium metal, heating the reaction mixture to reflux temperature, and introducing hydrogen sulfide into the mixture to form lithium sulfide.

2. A method according to claim 1 wherein an inert gas is introduced into the reaction mixture with hydrogen sulfide.

3. A method according to claim 1 wherein the reaction mixture is heated to a temperature in the range of from about 60° C. to about 75° C.

4. A method according to claim 1 wherein the ether is tetrahydrofuran.

5. A method according to claim 1 wherein the organic solvent comprises a mixture of an anhydrous aliphatic hydrocarbon solvent and an anhydrous cyclic ether.

6. A method according to claim 5 wherein the hydrocarbon is hexane and the ether is tetrahydrofuran.

7. A method according to claim 1 wherein the lithium metal is in pulverulent or finely divided form.

8. A method according to claim 1 wherein the particles of lithium metal range in size from about 10 to about 500 microns.

9. A method according to claim 1 wherein the hydrogen sulfide is introduced at a flow rate of from about 10 to about 50 liters per hours.

10. A method according to claim 1 wherein the formed lithium sulfide is separated from the reaction mixture, and dried in an inert atmosphere.